US012587266B2

(12) United States Patent
Carro

(10) Patent No.: US 12,587,266 B2
(45) Date of Patent: Mar. 24, 2026

(54) SYSTEMS AND METHODS FOR USING FLIGHT DATA RECORDER DATA

(71) Applicant: L3 Technologies, Inc., New York, NY (US)

(72) Inventor: Eduardo M. Carro, Sarasota, FL (US)

(*) Notice: Subject to any disclaimer, the term of this patent is extended or adjusted under 35 U.S.C. 154(b) by 543 days.

(21) Appl. No.: 16/598,716

(22) Filed: Oct. 10, 2019

(65) Prior Publication Data

US 2020/0119806 A1 Apr. 16, 2020

Related U.S. Application Data

(60) Provisional application No. 62/744,510, filed on Oct. 11, 2018.

(51) Int. Cl.
| | |
|---|---|
| *H04B 7/185* | (2006.01) |
| *G08G 5/20* | (2025.01) |
| *H04L 65/61* | (2022.01) |
| *H04L 67/12* | (2022.01) |

(52) U.S. Cl.
CPC ........... *H04B 7/18508* (2013.01); *G08G 5/20* (2025.01); *H04L 65/61* (2022.05); *H04L 67/12* (2013.01)

(58) Field of Classification Search
CPC .............. H04B 7/18508; G08G 5/0004; H04L 65/4069; H04L 67/12
See application file for complete search history.

(56) References Cited

U.S. PATENT DOCUMENTS

| | | | |
|---|---|---|---|
| 6,493,629 B1 | 12/2002 | Van Bosch | |
| 9,975,640 B1 * | 5/2018 | Wang | ...................... G01S 1/725 |
| 10,713,859 B1 * | 7/2020 | McZeal, Jr. | ............. G01S 19/17 |
| 2005/0228558 A1 * | 10/2005 | Valette | ...................... G08G 5/21 |
| | | | 340/945 |
| 2012/0191273 A1 * | 7/2012 | Jacobs | ............... H04B 7/18508 |
| | | | 701/3 |
| 2016/0055685 A1 * | 2/2016 | Lilly | .................... G07C 5/0808 |
| | | | 701/1 |
| 2016/0075443 A1 * | 3/2016 | Schmutz | ................ G07C 5/085 |
| | | | 701/14 |
| 2016/0176538 A1 | 6/2016 | Bekanich | |
| 2017/0063944 A1 * | 3/2017 | Nyikos | ............. H04B 7/18508 |
| 2017/0259942 A1 * | 9/2017 | Ziarno | .................... G07C 5/008 |
| 2018/0044034 A1 * | 2/2018 | Newman | ................ B64D 43/00 |

OTHER PUBLICATIONS

International Search Report and Written Opinion for International Application No. PCT/US2019/055665 dated Jan. 14, 2020, 12 pages.
Communication pursuant to Article 94(3) EPC dated Jul. 5, 2023 (Jul. 5, 2023), 9 pages, issued on related European patent application 19797881.0 by the European Patent Office.

* cited by examiner

*Primary Examiner* — Dhairya A Patel
(74) *Attorney, Agent, or Firm* — Dickinson Wright PLLC

(57) ABSTRACT

A flight data recorder (FDR) may include a script engine configured to run an algorithm in order to obtain, analyze and use FDR and Cockpit Voice and Data Recorder (CVDR) data for non-Technical Standard Orders (TSO) applications. The script engine may be configured, by the algorithm, to analyze flight data received by the FDR and use the flight data to output a trigger via an Ethernet port or an ARINC 429 output. The script engine may also analyze the flight data and stream at least a portion of the flight data via the Ethernet port or the ARINC port.

16 Claims, 5 Drawing Sheets

SYSTEMS AND METHODS FOR USING FLIGHT DATA RECORDER DATA

CROSS REFERENCE TO RELATED APPLICATION

This application claims the benefit under 35 USC 119(e) of prior U.S. Provisional Patent Application No. 62/744,510, filed Oct. 11, 2018, the disclosure of which is hereby incorporated by reference in its entirety.

BACKGROUND

Field of the Invention

Apparatuses and methods consistent with example embodiments relate to the use of Flight Data Recorder (FDR) data, and more particularly, apparatuses and methods for using FDR and Cockpit Voice and Data Recorder ("CVDR") data for non-Technical Standard Orders (TSO) applications.

Description of Related Art

Commercial aircraft typically include an aircraft recorder, sometimes called a "black box," which stores various data related to the current flight of the aircraft. The aircraft recorder may be an FDR, a cockpit voice recorder, or a combination voice and data recorder, such as a CVDR. This data is used to analyze aircraft crashes. Thus, FDRs and CVDRs are generally a repository of all of the data pertinent to the functionality of an aircraft. Such data is commonly recorded, with the FDR and/or CVDR having no knowledge of its content.

Flight data recorders currently receive data via ARINC 717 or other aircraft busses and store it in nonvolatile memory. The data is then retrieved for analysis when the aircraft lands for maintenance purposes or after an incident. The recorder does not process this data in any way, but store it raw with headers for time stamping. Thus, a stream of bits is received and recorded, but not decoded or utilized except after a flight is completed or an emergency has occurred. Nonetheless, such data may be pertinent to the real-time operation of the aircraft.

SUMMARY OF THE INVENTION

Exemplary embodiments may address at least the above problems and/or disadvantages and other disadvantages not described above. Also, exemplary embodiments are not required to overcome the disadvantages described above, and may not overcome any of the problems described above.

One or more example embodiments may provide ways to use data already present in the FDR and/or CVDR and process it.

According to an aspect of an example embodiment, a data processing method comprises a scripting engine disposed within a flight data recorder (FDR) receiving an algorithm from a script database within the flight data recorder; the scripting engine running the algorithm and thereby analyzing flight data and outputting a trigger from the FDR, based on the flight data, according to the algorithm.

The outputting the trigger from the FDR may comprise outputting the trigger via at least one of an Ethernet port and an Aeronautical Radio, Incorporated (ARINC) 429 output.

The outputting the trigger may further comprise outputting the trigger via the at least one of the Ethernet port and the ARINC 429 output to a server via a wireless transmission.

The method may further comprise the FDR receiving the flight data from an external device.

The FDR may be a line replaceable unit, and the method may further comprise loading the algorithm onto the script database of the flight data recorder via a data loader The running the algorithm may further comprise streaming at least a portion of the flight data from the FDR via at least one of an Ethernet port and an Aeronautical Radio, Incorporated (ARINC) 429 output.

The streaming may further comprise streaming at least the portion of the flight data via the at least one of the Ethernet port and the ARINC 429 output to at least one of a satellite data unit and an Automatic Dependent Surveillance-Broadcast (ADS-B) Mode S transponder.

The running the algorithm may further comprise streaming Health and Usage Monitoring System (HUMS) flight data from the FDR via at least one of an Ethernet port and an Aeronautical Radio, Incorporated (ARINC) 429 output.

The streaming may further comprise streaming the HUMS flight data via the at least one of the Ethernet port and the ARINC 429 output to at least one of a satellite data unit and an Automatic Dependent Surveillance-Broadcast (ADS-B) Mode S transponder.

According to an aspect of another example embodiment, a data processing system comprises a flight data recorder (FDR) comprising a trigger script database which stores therein an algorithm, a script engine configured to run the algorithm and thereby analyze flight data and output a trigger based on the flight data; an Ethernet output; and an Aeronautical Radio, Incorporated (ARINC) 429 output, The outputting the trigger may comprise outputting via at least one of the Ethernet output and the ARINC output.

The Ethernet port and the ARINC 429 output may each be configured to output data to a server via a wireless transmission.

The data processing system may further comprise a flight data receiver configured to receive the flight data from an external device.

The FDR is a line replaceable unit configured to receive the algorithm via a data loader.

The script engine may be further configured to run the algorithm and thereby stream at least a portion of the flight data from the FDR via at least one of the Ethernet port and the ARINC 429 output.

According to an aspect of another example embodiment, a flight data recorder (FDR) comprises a trigger script database which stores therein at least one algorithm; a script engine configured to run the algorithm and thereby analyze flight data and output a trigger based on the flight data; an Ethernet port; and an Aeronautical Radio, Incorporated (ARINC) 429 output; wherein the script engine is configured to output the trigger via at least one of the Ethernet port and the ARINC 429 output.

The Ethernet port and the ARINC 429 output may be each configured to output data to a server via a wireless transmission.

The FDR may further comprise a flight data receiver configured to receive the flight data from an external device.

The FDR is a line replaceable unit configured to receive the algorithm via a data loader.

The script engine may be further configured to run the algorithm and thereby stream at least a portion of the flight data from the FDR via at least one of the Ethernet port and the ARINC 429 output.

The script engine may be further configured to run the algorithm and thereby stream Health and Usage Monitoring System (HUMS) flight data from the FDR via at least one of the Ethernet port and the ARINC 429 output.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Figure 1:
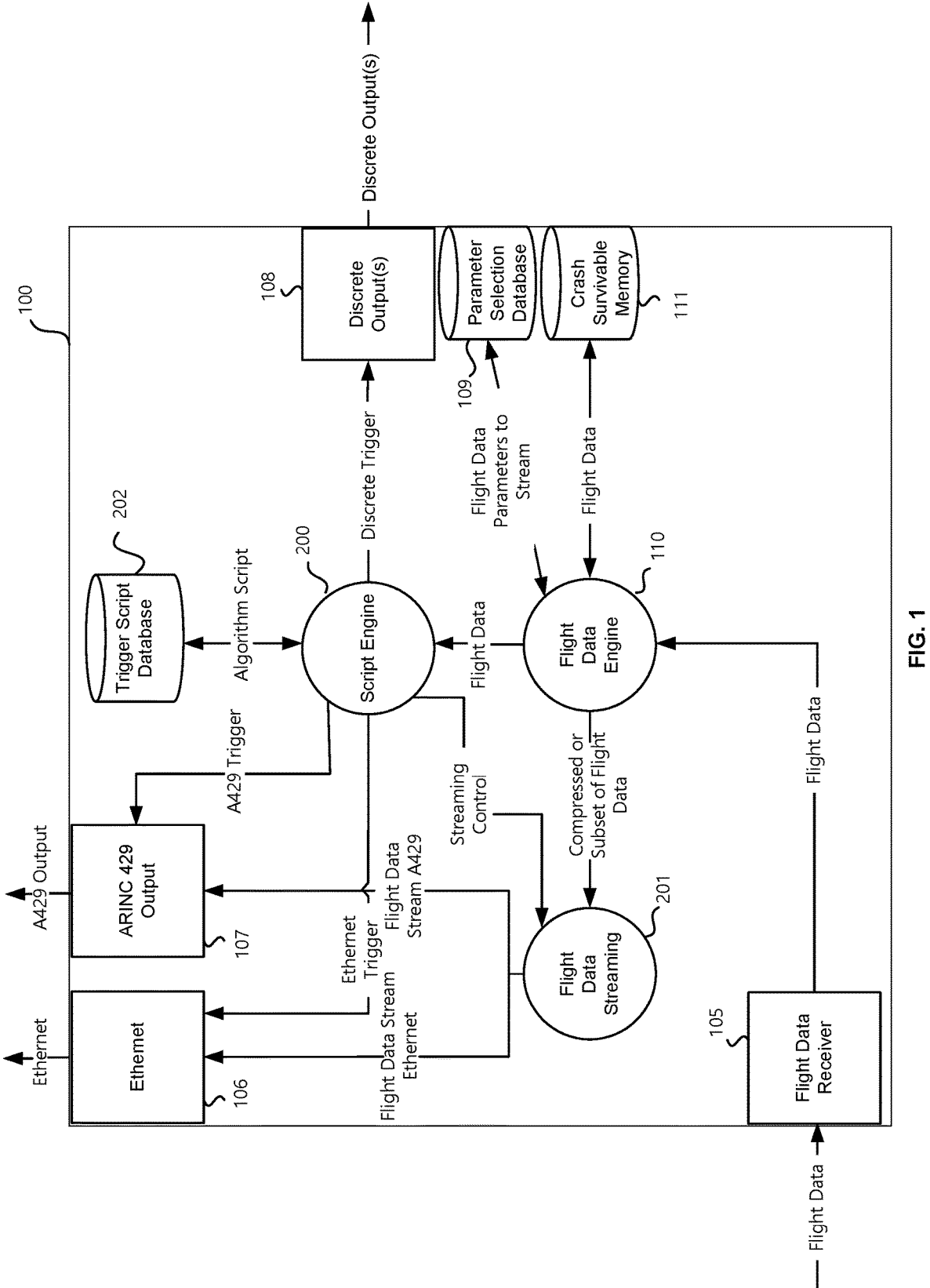
FIG. 1 illustrates the block architecture of an FDR 100 including a recorder scripting engine, according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/ or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

Methods illustrated in the various figures may include more, fewer, or other operations, and operations may be performed in any suitable order. Connecting lines shown in the various figures are intended to represent example functional relationships and/or physical couplings between and among the various elements. One or more alternative or additional functional relationships or physical connections may be present in a practical system.

One or more example embodiments described herein may provide a way to use data already present in an FDR and/or CVDR and process it. Such example embodiments may comprise a software engine running one or more scripts that may process the data and perform a function (e.g., generating a trigger, streaming, etc.) as a result of running the script. Any desired language may be employed, such as Python, to run a script by adding a Python interpreter, in an example exemplary case in which Python is used, to the FDR/CVDR. These one or more scripts may be loaded into the FDR/ CVDR at the time of manufacturing or in the field, by loading them onto the recorder using an ARINC 615 data loader or the like, and thereafter may be run at a predefined rate based on the script(s) itself. Results of running the script(s) are outputs, which may be Aeronautical Radio, Incorporated (ARINC) 429 outputs, discrete outputs and/or Ethernet commands/streaming. Example uses of these scripts may be distress tracking trigger algorithms, selected parameter streaming, Health and Usage Monitoring Systems (HUMS), and the like, as would be understood by one of skill in the art.

As noted above, while FDRs and CVDRs are repositories of data pertinent to the functionality of an aircraft, currently, such data is just recorded within the FDR/CVDR, with the FDR/CVDR having no knowledge of its content. One or more example embodiments described herein may provide a way for the FDR and/or CVDR to access and analyze the data stored therewithin, and to provide an output as a result of the analysis that can be used to alert, or to report to other devices external or internal to the aircraft.

According to an example embodiment, a recorder scripting engine is provided and processes FDR and/or CVDR data for non-TSO applications, that can run concurrently with the recorder TSO functionality. The method consists of a software engine running one or more scripts that process the data and perform a function (triggers, streaming, etc.) as a result of running the script.

A simple language such as Python may be used to run the scripts by adding a Python Interpreter to the recorder. However, this is merely exemplary, and any other language could be used as would be understood by one of skill in the art. The scripts may be loaded onto the recorder at manufacturing time or in the field, and may be run at a predefined rate based on the script itself. The result of running these scripts are the outputs Multiple scripts may be run concurrently on the recorder.

FIG. 1 illustrates the block architecture of an FDR 100 including a recorder scripting engine 200 according to an example embodiment. The FDR may be an SRCICR-NXT Flight Data Recorder. Examples of usage of the scripting engine 200 include, but are not limited to distress tracking trigger algorithms, selected parameter streaming, and HUMS Scripts may be loaded onto the recorder scripting engine 200 via an ARINC 615 data loader which enables loading of data onto a Line Replaceable Unit (LRU) of an aircraft network, such as an FDR and a CVDR.

The FDR 100 includes a number of ports providing input/output capabilities including a flight data receiver port 105, which receives flight data from the Flight Data Acquisition unit (FADU), which is part of the aircraft avionics, an Ethernet port 106 providing an Ethernet output; an ARINC 429 output port 107; and a discrete output 108. The ports 106, 107, and 108 may provide outputs to any of various external devices, as will be discussed in further detail below. The flight data engine 110 provides the flight data to a crash-survivable memory 111.

The flight data engine 110 also provides the flight data to a flight data streaming module 201, which, in turn, may transmit the flight data in a stream to the Ethernet port 106 and/or the ARINC port 107. The data provided to the flight data streaming module 201 may be a compressed format of the flight data and/or a subset of the flight data received from the flight data receiver 105. The flight data streaming module may be controlled by the scripting engine 200. Likewise, the scripting engine may control the ARINC output 107 via an A429 trigger. The scripting engine 200 may control the discrete output 108 to output one or more triggers based on the received flight data and a script. The flight data engine 110 may use information stored in a parameter selection database 109 to determine the parameters which are being streamed.

Autonomous distress tracking provides the capability to determine the position of an aircraft in distress, at least once every minute, using the transmission of information which is resilient to failures of the aircraft's electrical power, navigation, and communication systems. To identify a distress condition, an aircraft's state is analyzed in real-time by aircraft systems or ground processes, and the use of event detection and triggering criteria logic can initiate distress tracking to assist in locating the aircraft in distress. Thus, distress tracking combines position reporting at intervals of one minute or less with a distress notification. The event detection and triggering can be used to identify a distress condition (for a system that is already transmitting position information), or to notify a distress condition and also commence the transmission of positon information. Distress tracking may also be manually initiated by the flight crew to generate a notification.

Triggering criteria may include analysis of unusual altitudes, unusual speeds, potential collision with terrain, a total loss of thrust/propulsion on all engines, Mode A squawk codes, and the like. Triggers may be defined to ensure that the criteria used maximizes the probability of detection of an upcoming catastrophic event and minimizes the probability of nuisance events. Eurocae ED 237 defines algorithms that can be used to provide triggers to devices that can initiate distress messages to the authorities.

Certain industry groups are proposing architectures to provide these capabilities, since autonomous distress tracking may be mandated in the future.

The recorder scripting engine 200 may run algorithms compliant with Eurocae ED 237 and thereby enable a real time monitoring of the aircraft data received by the FDR 100. In this way, the recorder scripting engine 200 may provide distress triggers to emergency transmission equipment such as an Emergency Locator Transmitter-Distress Tracking (ELT-DT) device. The ED 237 algorithms can be loaded on the recorder either at manufacturing time or interactively at a later time.

An ARINC 615 data loader, for example, enables the loading of data onto a Line Replaceable Unit (LRU) of an aircraft network, such as an FDR and a CVDR.

The triggers tied to this functionality can be either discrete triggers, or ARINC 429 or Ethernet links to the ELT-DT or another transmitting device. According to an aspect of this example embodiment, an economical solution to the distress tracking problem may be provided since it doesn't require new LRUs to be able to generate distress triggers themselves. This is an addition to an already-installed device.

Figure 2:
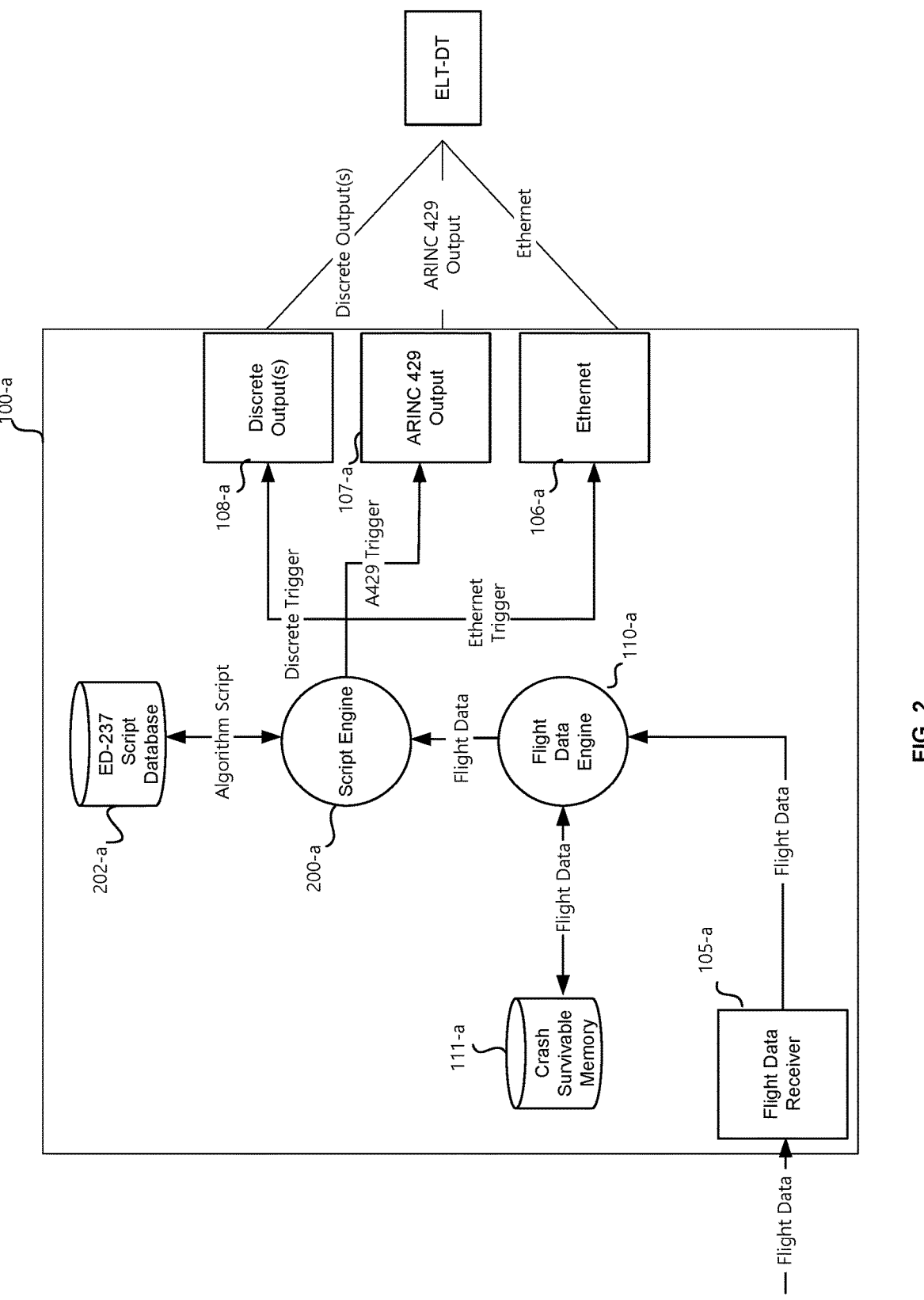
FIG. 2 illustrates a block diagram of a recorder script engine running ED 237 algorithms to trigger an ELT-DT, according to another example embodiment.

FIG. 2 illustrates a block diagram of a recorder script engine 200-a running ED 237 algorithms to trigger an ELT-DT.

Flight data streaming is a technology that satisfies the intent of the timely recovery of flight data in of the Global Aeronautical Distress & Safety System (GADSS). There are two ways of data streaming: continuous and triggered. In continuous data streaming, all of the data that is recorded in the flight data recorder 100, is also streamed continuously via a satellite communications link. In triggered streaming, a trigger automatically determines the beginning of the streaming.

The triggering may be determined based on one or more of unusual altitudes, unusual speeds, a potential collision with terrain, total loss of thrust/propulsion on all engines, Mode A squawk codes, and the like. The triggers may be defined to ensure that the probability of detection of an upcoming event is maximized while the probability of nuisance events is minimized. ED 237 defines algorithms that can be used to provide the triggers to devices that can initiate distress messages to the authorities.

Figure 3:
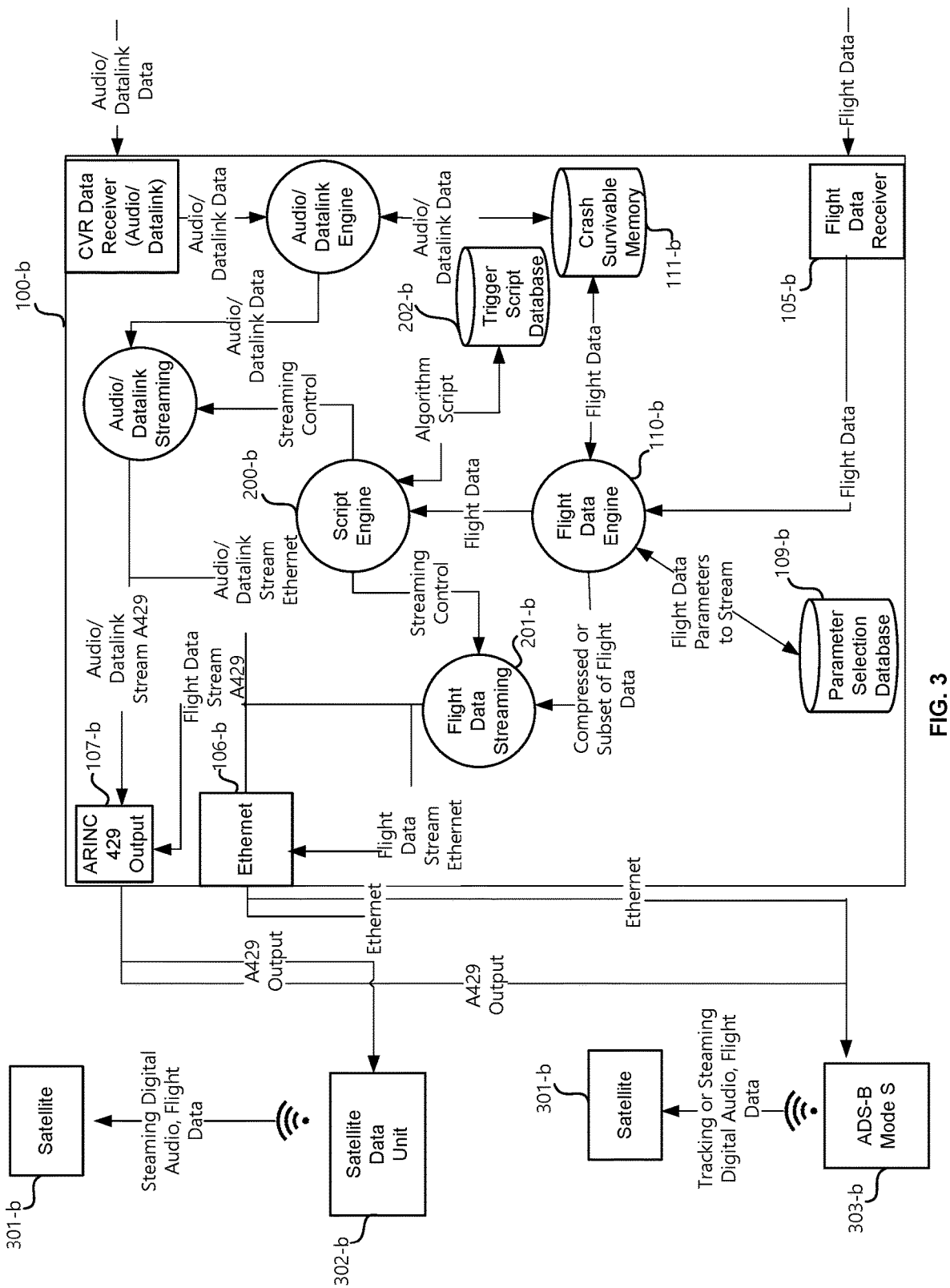
FIG. 3 illustrates a block diagram of a recorder script engine running distress algorithms to trigger the streaming of data, according to another example embodiment.

According to another example embodiment, a recorder scripting engine running ED 237 algorithms inside an FDR may provide a real time way of monitoring aircraft data, and providing streaming triggers to start the streaming of data, including not only flight data, but audio and data link data as well. The recorder scripting engine may stream to a satellite modem, an Automatic Dependent Surveillance-Broadcast (ADS B) Mode-S transponder or to any other satellite-connected router via Ethernet or ARINC 429 ports. FIG. 3 illustrates a block diagram of a recorder script engine 200-b running distress algorithms to trigger the streaming of data including one or more of audio data, datalink data, and FDR data.

The term "Health and usage monitoring systems (HUMS)" generically refers to activities that utilize data collection and analysis techniques to help ensure the availability, reliability and safety of vehicles. Activities similar to, or sometimes used interchangeably with, HUMS include, but are not limited to, condition-based maintenance (CBM) and operational data recording (ODR). This term HUMS is often used in reference to airborne craft and in particular rotor-craft.

HUMS are now used not only for safety but additionally for a number of other reasons including: maintenance (including reduced mission aborts, fewer instances of aircraft on ground (AOG), and simplified logistics for fleet deployment); cost ("maintain as you fly" maintenance flights are not required with the use of HUMS, and performing repairs when the damage is minor increases the aircraft mean time to failure (MTBF) and decreases the mean time to repair (MTTR)); operational (including, improved flight safety, mission reliability, and effectiveness); and performance (including improved aircraft performance and reduced fuel consumption).

Figure 4:
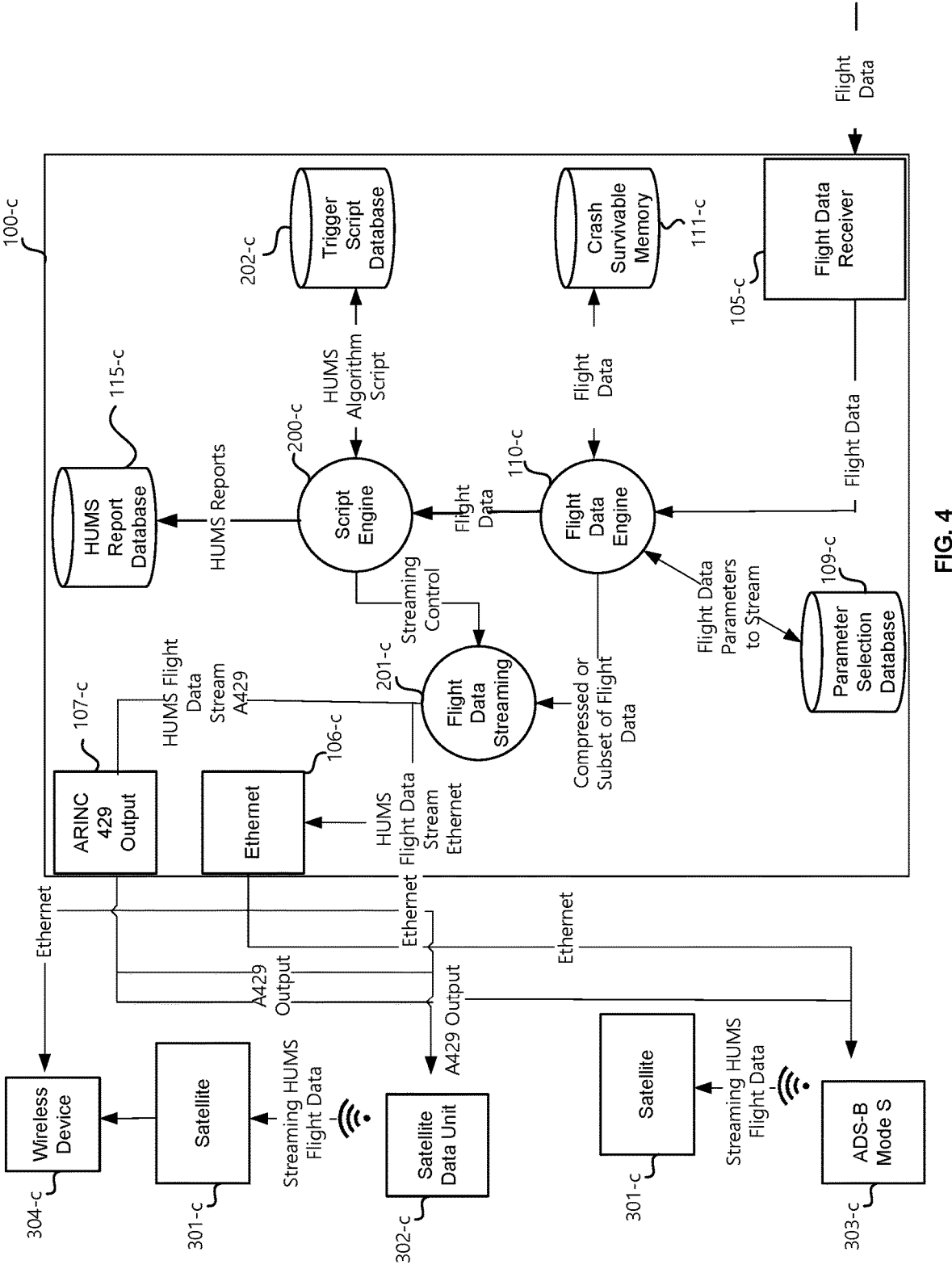
FIG. 4 illustrates a block diagram of a recorder script engine running HUMS algorithms, according to another example embodiment.

According to one or more example embodiments, a recorder scripting engine running HUMS algorithms inside an FDR may provide a real time way of monitoring the aircraft health, and a stream of health data as reports or real-time information via a connection to maintenance depots. A HUMS algorithm can be created and loaded by the customers themselves, so the algorithm can be changed at a moment's notice to be able to target specific issues. The recorder can stream to a satellite modem, ADS-B Mode-S transponder, or any other satellite connected router via Ethernet or ARINC 429, as would be understood by one of skill in the art. FIG. 4, illustrates a block diagram of a recorder script engine 200-c running HUMS algorithms, from a trigger script database 202-c, to control a flight data streaming module 201-c to trigger the streaming of HUMS specific recorder data or HUMS reports in real time or when the aircraft lands.

Due to its location within the aircraft, a recorder, such as the FDR 100-c, might not be easily accessible to be able to download its data. Wireless access, therefore, may easily enable access to the data, and may enable the use of a portable wireless device 304-c (a tablet, or the like etc.) to read and present the data. Wireless technologies include Wi-Fi, Cell, and Bluetooth, among others, as would be understood by one of skill in the art. Security issues may be addressed in order for the download of data to start only after the aircraft has landed and it is safely in a gate.

Figure 5:
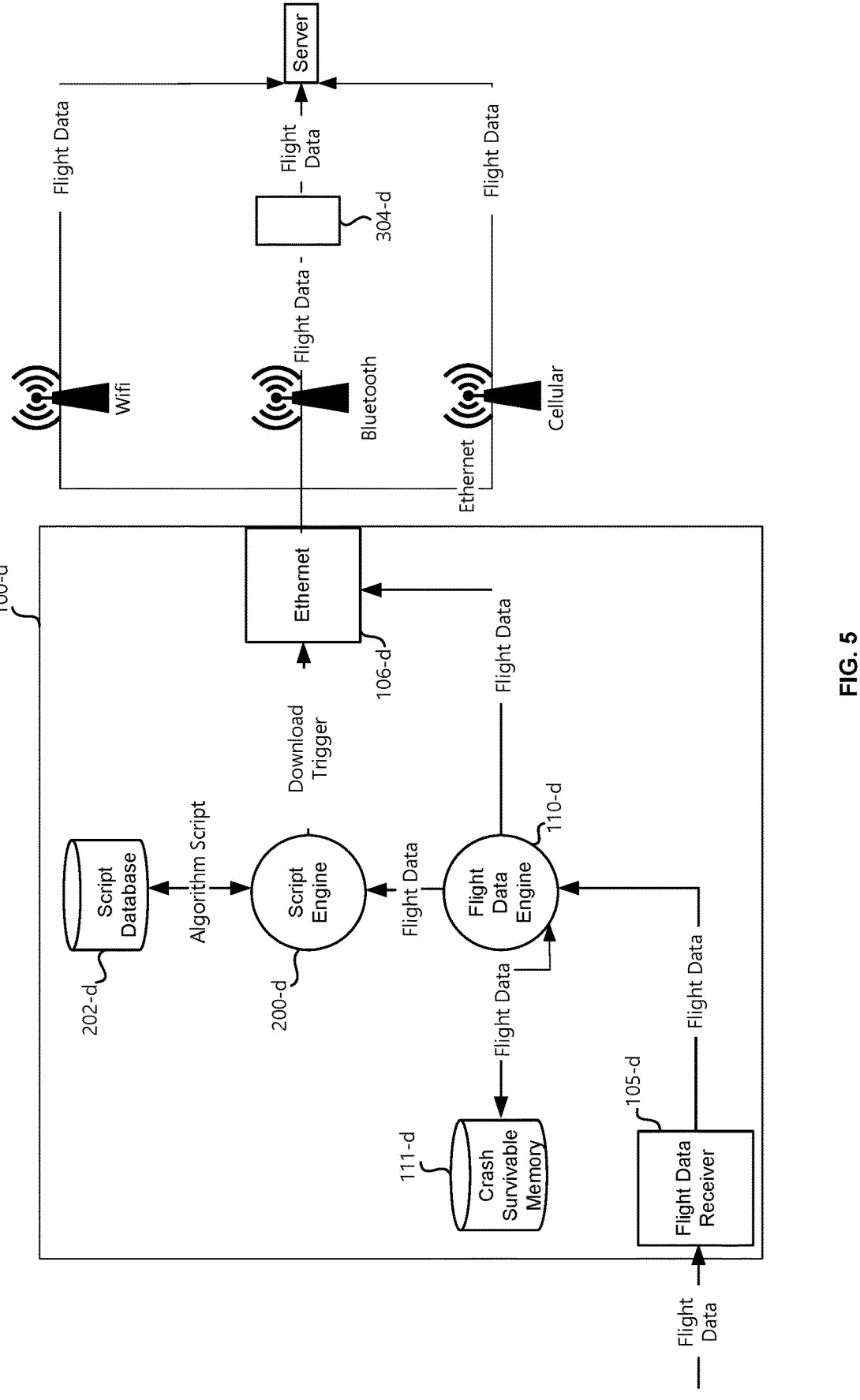
FIG. 5 illustrates a block diagram of a recorder script engine running algorithms, according to another example embodiment.

A recorder script engine running algorithms inside an FDR that monitor the speed of the aircraft, weight on wheels or other signals contained within the FDR data can be used to initiate an automated download of data to one or more different wireless devices depending on availability. These wireless devices (satellite, Wi-Fi, Bluetooth or Cellular) can be used to route the data automatically to a server where the data can be stored for post processing at a later time. FIG. 5, illustrates a block diagram of a recorder script engine 200-d running algorithms to trigger the download of recorder data (e.g. Datalink, FDR).

In order to provide the infrastructure in the FDR to support a scripting engine: a Python Interpreter is implemented within the FDR architecture. Python is an open source scripting interpreter that has been implemented in all sorts of Embedded products.

Python Interpreter code is obtained from a vendor or an open source code organization. Licensing agreements for such source code are also obtained.

A Python Interpreter may be implemented over a real time operating system.

An application programming interface (API) may be created to support the FDR interfaces that are used.

FDR data mapping and processing may be implemented within the recorder itself.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A data processing method comprising:
a scripting engine disposed within a flight data recorder (FDR) receiving a plurality of algorithms from a script database within the flight data recorder; and the scripting engine running the plurality of algorithms and thereby analyzing flight data and outputting a trigger from the FDR, based on the flight data, according to one or more of the plurality of algorithms.

2. The data processing method according to claim 1, wherein the outputting the trigger from the FDR comprises outputting the trigger via at least one of an Ethernet port and an Aeronautical Radio, Incorporated (ARINC) 429 output.

3. The data processing method according to claim 2, wherein the outputting the trigger further comprises outputting the trigger via the at least one of the Ethernet port and the ARINC 429 output to a server via a wireless transmission.

4. The data processing method according to claim 1, further comprising the FDR receiving the flight data from an external device.

5. The data processing method according to claim 1, wherein the FDR is a line replaceable unit, and the method further comprises loading the plurality of algorithms onto the script database of the flight data recorder via a data loader.

6. The data processing method according to claim 1, wherein the running the algorithm further comprises streaming at least a portion of the flight data from the FDR via at least one of an Ethernet port and an Aeronautical Radio, Incorporated (ARINC) 429 output.

7. The data processing method according to claim 6, wherein the streaming further comprises streaming at least the portion of the flight data via the at least one of the Ethernet port and the ARINC 429 output to at least one of a satellite data unit and an Automatic Dependent Surveillance-Broadcast (ADS-B) Mode S transponder.

8. A flight data recorder (FDR) comprising:
a trigger script database which stores therein a plurality of algorithms;
a scripting engine configured to run the plurality of algorithms and thereby analyze flight data and output a trigger based on the flight data;
an Ethernet port; and
an Aeronautical Radio, Incorporated (ARINC) 429 output;
wherein the scripting engine is configured to output the trigger via at least one of the Ethernet port and the ARINC 429 output.

9. The FDR according to claim 8, wherein the Ethernet port and the ARINC 429 output are each configured to output data to a server via a wireless transmission.

10. The FDR according to claim 8, further comprising a flight data receiver configured to receive the flight data from an external device.

11. The FDR according to claim 8, further comprising:
a Python interpreter.

12. The FDR according to claim 11, wherein the FDR is a line replaceable unit, and the scripting engine is configured to receive the first algorithm and the second algorithm via a data loader.

13. The FDR according to claim 11, wherein the scripting engine is further configured to run the second algorithm and thereby stream Health and Usage Monitoring System (HUMS) flight data from the FDR via at least one of the Ethernet port and the ARINC 429 output.

14. The FDR according to claim 8, wherein the scripting engine is further configured to run the plurality of algorithms and thereby stream at least a portion of the flight data from the FDR via at least one of the Ethernet port and the ARINC 429 output.

15. A flight data recorder (FDR) comprising:

a trigger script database which stores therein a plurality of algorithms;

a scripting engine configured to receive and run the plurality of algorithms;

an Ethernet port; and an Aeronautical Radio, Incorporated (ARINC) 429 output;

wherein the scripting engine is further configured to:

receive and run a first algorithm of the plurality of algorithms;

receive and run a second algorithm of the plurality of algorithms, thereby changing an algorithm run by the scripting engine; and by running the second algorithm, analyze flight data and output a trigger based on the flight data.

16. The FDR according to claim 15, wherein the scripting engine comprises a Python interpreter.

\* \* \* \* \*